July 8, 1924.
R. C. BENNER
1,500,219
STORAGE BATTERY GRID
Filed May 2, 1922
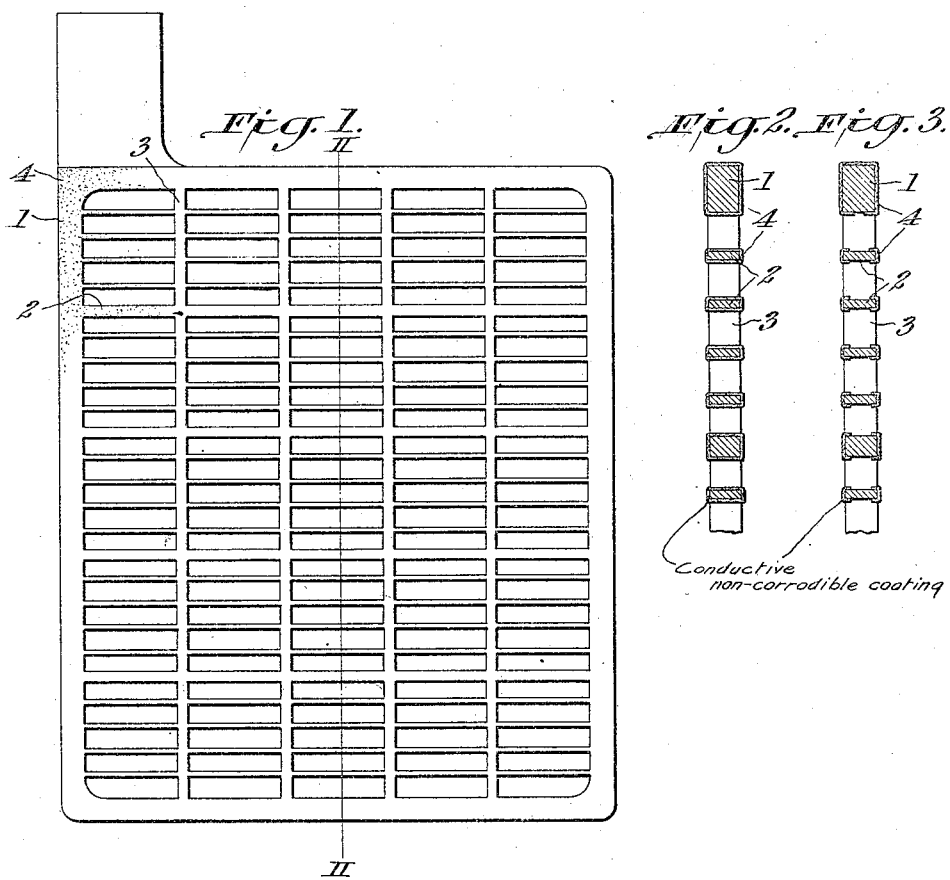
Inventor:
Raymond C. Benner Patented July 8, 1924.

1,500,219

UNITED STATES PATENT OFFICE.

RAYMOND C. BENNER, OF BAYSIDE, NEW YORK, ASSIGNOR, BY MESNE ASSIGNMENTS, TO THE PREST-O-LITE COMPANY, INC., OF NEW YORK, N. Y., A CORPORATION OF NEW YORK.

STORAGE-BATTERY GRID.

Application filed May 2, 1922. Serial No. 557,905.

*To all whom it may concern:*

Be it known that I, RAYMOND C. BENNER, a citizen of the United States, residing at Bayside, in the county of Queens and State of New York, have invented certain new and useful Improvements in Storage-Battery Grids, of which the following is a specification.

This invention relates to protective coatings for the electrodes of galvanic cells. The invention is particularly applicable to the positive grids or plates of storage batteries of the lead-sulfuric acid-lead dioxid type, and this embodiment will be described by way of illustration herein.

It has heretofore been proposed to coat such portions of storage battery grids as are exposed to the action of the electrolyte with non-conductive, insulating materials, for example, glass, celluloid, or rubber, to prevent local action and corrosion at the grid surface. Such procedure, while effectual in these respects, has the disadvantage of subtantially increasing the internal resistance of the battery.

I have discovered that certain conductive, non-corrodible coatings, hereinafter described, may be applied to storage battery grids, with the result that the metal is made immune to attack by the electrolyte without materially diminishing the conductivity of the grid. A protective coating is especially necessary on the grid carrying the lead dioxid, as otherwise destructive local action is set up between the dioxid and the metal of the grid. The preferred coating material is a composition comprising lead dioxid and a plastic material, such as asphalt.

In the accompanying drawing, illustrative of the invention,

Fig. 1 is a side elevation of a grid,

Fig. 2 is an enlarged transverse section taken on line II—II, Fig. 1, and

Fig. 3 is a similar view showing a modification in which only the portions of the grid adjacent the surface of the active material are coated.

Referring to the drawing, reference numeral 1 denotes a grid, which may be of any suitable construction and material. I prefer to use a lead-antimony grid, having intersecting ribs 2 and 3, and of sufficient size and strength to carry a relatively large amount of active material. The grid is coated with a conductive, non-corrodible material 4, such as lead dioxid in asphalt. This may be applied by dipping the grid into the conductive material in plastic condition, or by brushing, spraying, or in any other suitable manner. The asphalt may be made plastic by heat or may be dissolved in a suitable solvent. The coating is preferably coextensive with the grid surface, as shown in Fig. 2. However, beneficial results are also obtained by applying the material only to the outer parts of the grid, as in the modification illustrated in Fig. 3.

The lead dioxid-asphalt plastic, referred to above, may be prepared by mixing the dioxid in a relatively fine state of subdivision with the asphalt. The dioxid should in most cases constitute about 85% of the weight of the mixture, to secure the best results. This proportion may of course be varied widely, according to the conductivity required. I have found that lead dioxid imparts satisfactory conductivity to the coating and does not cause local action on the positive grid. Instead of lead dioxid in asphalt, I may use other conductive protecting compositions, which are without adverse effect on the battery such as lead dioxid carried in a matrix of rubber. Various other changes in the specific construction and materials given herein by way of illustration may be made within the scope of the appended claims.

I claim:

1. A conductive support for the active material of storage batteries coated with a plastic conductive protective layer comprising lead dioxid.

2. A storage battery grid coated with a conductive, protecting layer comprising lead dioxid and asphalt.

In testimony whereof, I affix my signature.

RAYMOND C. BENNER.